(12) United States Patent
Kim et al.

(10) Patent No.: US 12,095,097 B2
(45) Date of Patent: Sep. 17, 2024

(54) CURRENT COLLECTOR FOR ELECTRODE

(71) Applicant: U&S ENERGY, INC., Cheonan-si (KR)

(72) Inventors: Kyung Joon Kim, Daejeon (KR); Seung Ho Choi, Daejeon (KR)

(73) Assignee: U&S ENERGY, INC., Cheonan-si (KR)

(*) Notice: Subject to any disclaimer, the term of this patent is extended or adjusted under 35 U.S.C. 154(b) by 613 days.

(21) Appl. No.: 17/424,806

(22) PCT Filed: Feb. 10, 2020

(86) PCT No.: PCT/KR2020/001817
§ 371 (c)(1),
(2) Date: Jul. 21, 2021

(87) PCT Pub. No.: WO2020/166904
PCT Pub. Date: Aug. 20, 2020

(65) Prior Publication Data
US 2022/0085382 A1 Mar. 17, 2022

(30) Foreign Application Priority Data

Feb. 14, 2019 (KR) .................. 10-2019-0017132

(51) Int. Cl.
*H01M 4/66* (2006.01)
*H01M 4/04* (2006.01)
(Continued)

(52) U.S. Cl.
CPC ......... *H01M 4/667* (2013.01); *H01M 4/0404* (2013.01); *H01M 4/661* (2013.01);
(Continued)

(58) Field of Classification Search
CPC .... H01M 4/667; H01M 4/0404; H01M 4/661; H01M 10/0587; H01M 50/533;
(Continued)

(56) References Cited

U.S. PATENT DOCUMENTS 10,431,830 B2    10/2019   Oku et al.
2015/0318555 A1  11/2015   Oku et al.
(Continued)

FOREIGN PATENT DOCUMENTS

CN    104604003 A    5/2015
EP    3832764 A1     6/2021
(Continued)

OTHER PUBLICATIONS

Translation of WO 2012118127 (Year: 2012).*
Translation of JP11102711 (Year: 1999).*

*Primary Examiner* — Daniel S Gatewood
(74) *Attorney, Agent, or Firm* — NKL Law; Jae Youn Kim

(57) ABSTRACT

A current collector for electrodes according to the present disclosure may include: a polymer film; a metal piece provided on at least one of upper and lower surfaces of the polymer film or one side of at least one of edges of the polymer film; an adhesive portion provided on surfaces of the polymer film and the metal piece to cover a boundary portion of the polymer film and the metal piece; and a conductive material formed on the surfaces of the polymer film, the metal piece, and the adhesive portion.

11 Claims, 13 Drawing Sheets

(51) Int. Cl.
  *H01M 10/0587* (2010.01)
  *H01M 50/533* (2021.01)
  *H01M 50/536* (2021.01)
  *H01M 50/538* (2021.01)

(52) U.S. Cl.
  CPC ..... *H01M 10/0587* (2013.01); *H01M 50/533* (2021.01); *H01M 50/536* (2021.01); *H01M 50/538* (2021.01)

(58) Field of Classification Search
  CPC ............ H01M 50/536; H01M 50/538; H01M 10/0525; H01M 10/058; H01M 10/4235; H01M 50/572; Y02E 60/10; Y02P 70/50
  See application file for complete search history.

(56) References Cited

U.S. PATENT DOCUMENTS

2016/0049662 A1    2/2016   Kim et al.
2018/0351212 A1   12/2018   Matsui et al.

FOREIGN PATENT DOCUMENTS

| | | | | |
|---|---|---|---|---|
| JP | 05-335013 A | | 12/1993 | |
| JP | 11102711 A | * | 4/1999 | |
| KR | 10-2006-0102745 A | | 9/2006 | |
| KR | 10-2013-0125592 A | | 11/2013 | |
| KR | 10-2014-0131115 A | | 11/2014 | |
| KR | 10-2015-0048707 A | | 5/2015 | |
| WO | WO-2012118127 A1 | * | 9/2012 | ............ H01M 2/266 |

* cited by examiner

CURRENT COLLECTOR FOR ELECTRODE

TECHNICAL FIELD

The present disclosure relates to a current collector for electrodes, and more particularly, to a current collector for electrodes capable of reducing a weight of the electrode by not using a metal foil and reducing a thickness of a lead tab welding area.

BACKGROUND ART

As technology development and demand for mobile devices increase, a demand for secondary batteries as an energy source is rapidly increasing. Among such secondary batteries, a lithium secondary battery that has high energy density and operating potential and has a low self-discharge rate has been commercialized.

The lithium secondary battery is the first commercialized secondary battery, and uses lithium metal as an anode. However, since the lithium secondary battery has problems of cell volume expansion and gradual decrease in capacity and energy density due to lithium dendrites formed on a surface of a lithium metal anode, and have problems of a short circuit, reduced cycle life, and reduced cell stability (explosion and ignition) due to continuous growth of dendrites, the production of the lithium secondary battery is stopped only a few years later after the lithium secondary battery is commercialized. Therefore, instead of using the lithium metal, carbon-based anodes that may be more stable and stably store lithium in an ion state in a lattice or an empty space have been used. Due to the use of the carbon-based anodes, the lithium secondary battery is being commercialized and popularized in earnest.

So far, the lithium secondary battery has mainly been made of carbon-based or non-carbon-based anode materials. Development of most anode materials is focused on carbon-based (graphite, hard carbon, soft carbon, etc.) and non-carbon-based (silicon, tin, titanium oxide, etc.) materials.

Meanwhile, in recent years, as a portable electronic device and an information communication device are miniaturized, the lithium secondary battery is greatly expected to be used as an ultra-small power system for driving the portable electronic device and the information communication device.

Moreover, in recent years, the development and research of polymer-based electronic devices and devices using advantages such as flexibility, low price, and ease of manufacture are being actively conducted. Therefore, in order for the lithium secondary batteries to be used in miniaturized devices, it is necessary to reduce the thickness or weight of the lithium secondary battery while maintaining the energy density or performance of the lithium secondary battery.

In addition, even if the thickness or weight of the lithium secondary battery is reduced, the safety and energy density of the lithium secondary battery need to increase by blocking or destroying a current pass when an internal short circuit occurs.

The present applicant proposes the present disclosure in order to solve the above problems.

DISCLOSURE

Technical Problem

The present disclosure proposes to solve the above problems, and provides a current collector for electrodes having a smaller thickness than that of a current collector made of a metal foil.

In addition, the present disclosure provides a current collector for electrodes having a weight less than that of a current collector made of a metal foil.

In addition, the present disclosure provides a current collector for electrodes capable of reducing a short-circuit current when an internal short circuit occurs because the current collector for electrodes has a resistance value greater than that of a current collector made of a metal foil.

In addition, the present disclosure provides a current collector for electrodes capable of reducing a thickness of a lead tab welding area and improving conductivity.

In addition, the present disclosure provides a current collector for electrodes that can be used not only in a winding type electrode assembly but also in a stack type electrode assembly.

Technical Solution

According to the present disclosure, a current collector for electrodes may include: a polymer film; a metal piece provided on at least one of upper and lower surfaces of the polymer film or one side of at least one of edges of the polymer film; an adhesive portion provided on surfaces of the polymer film and the metal piece to cover a boundary portion of the polymer film and the metal piece; and a conductive material formed on the surfaces of the polymer film, the metal piece, and the adhesive portion.

The current collector for electrodes may include: a lead tab connected to the metal piece, in which an edge of the metal piece may be provided at a position that does not protrude outward from the edge of the polymer film.

The adhesive portion provided to cover the boundary portion of the metal piece and the polymer film positioned inside from the edge of the polymer film may be provided at at least one of the other edges except for the edge of the metal piece which is in a direction in which the lead tab extends from the metal piece.

The current collector for electrodes provided at a position where the edge of the metal piece does not protrude outward from the edge of the polymer film may be wound to form an electrode assembly.

The current collector for electrodes may include: a lead tab 190 connected to the metal piece, in which an edge of the metal piece may be provided at a position that protrudes outward from the edge of the polymer film.

The metal pieces may be provided on one side of the edge of the polymer film not to overlap each other or to be positioned on the same plane at the boundary portion with the polymer film, and when thicknesses of the polymer film and the metal piece are different, the adhesive portion may be provided to cover the boundary portion of the polymer film and the metal piece in a state where a step portion is formed.

The metal piece may be provided to be positioned in a hole formed in the polymer film.

The current collector for electrodes provided at a position where the edge of the metal piece protrudes outward from the edge of the polymer film may be stacked to form an electrode assembly.

Advantageous Effects

In a current collector for electrodes according to the present disclosure, a polymer film made of an insulator instead of a metal foil is used, so it is possible to reduce the weights of the current collector and the battery.

In addition, in a current collector for electrodes according to the present disclosure, instead of using a metal foil, a conductive material is coated on a surface of a polymer film and a plating layer is formed on the surface of the polymer film, so a thickness of the current collector for electrodes according to the present disclosure may be further reduced than that of the current collector made of the metal foil.

In addition, according to the present disclosure, since a current collector for electrodes has a resistance value greater than a resistance of a current collector made of a metal foil, and also a current flow may be disturbed due to damage to a polymer film, a short-circuit current may be reduced when an internal short circuit occurs and the safety of a battery may be improved.

In addition, in a current collector for electrodes according to the present disclosure, an adhesive portion is provided separately to be adhered to a metal piece and a polymer film on the metal piece, and a lead tab is connected to the metal piece in that state, so a thickness of a lead tab connection portion may be reduced.

In addition, according to the present disclosure, since a current collector for electrodes may be used not only in a winding type electrode assembly but also in a stack type electrode assembly, productivity or economical efficiency may be improved.

BEST MODE

Figure 1:
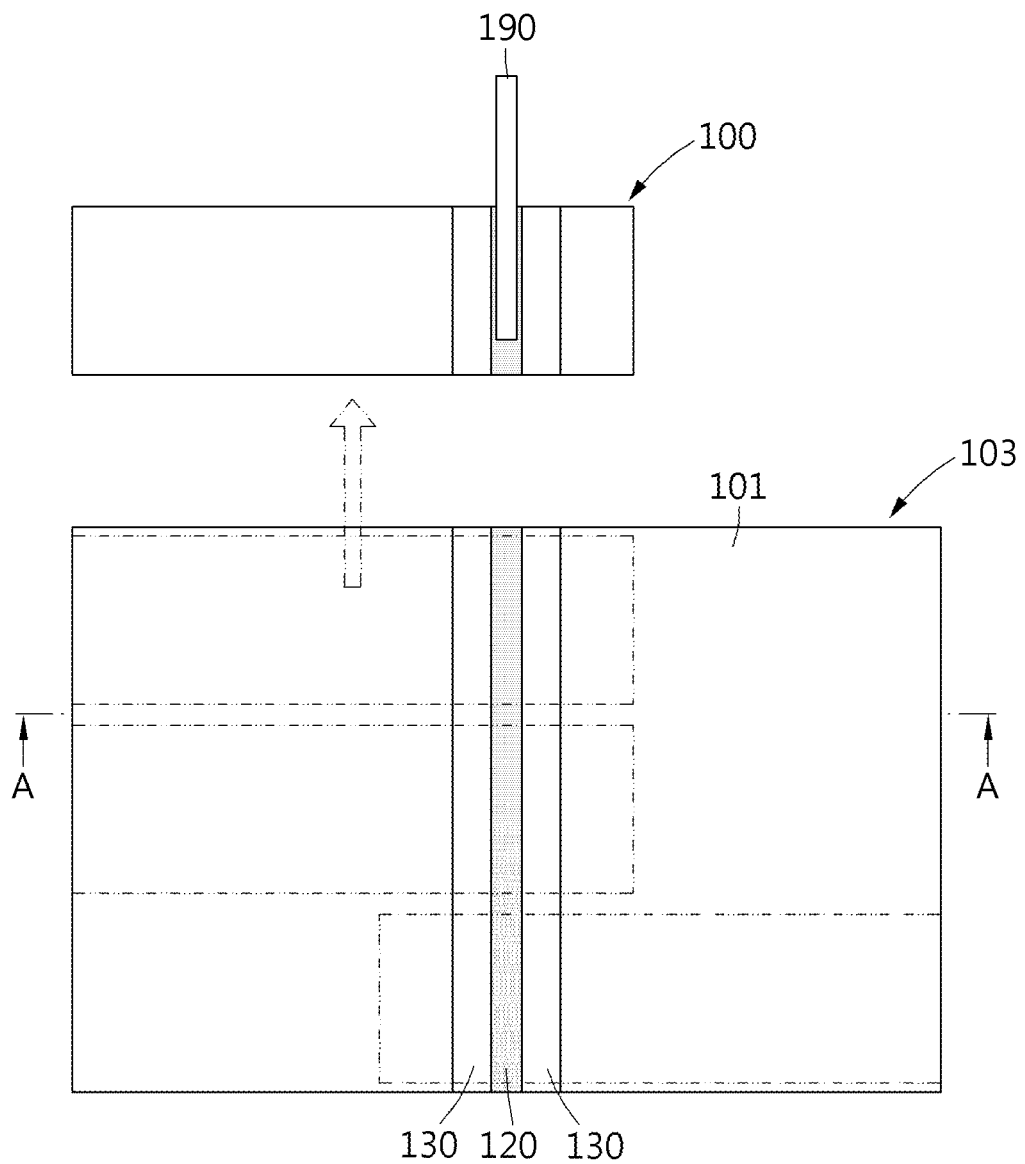
FIG. 1 is a plan view for describing a process of manufacturing a current collector for electrodes according to an embodiment of the present disclosure.

Hereinafter, embodiments of the present disclosure will be described in detail with reference to the accompanying drawings. However, the present disclosure is not limited or restricted to the embodiments. Like reference numerals proposed in each drawing denote like components.

Figure 2:
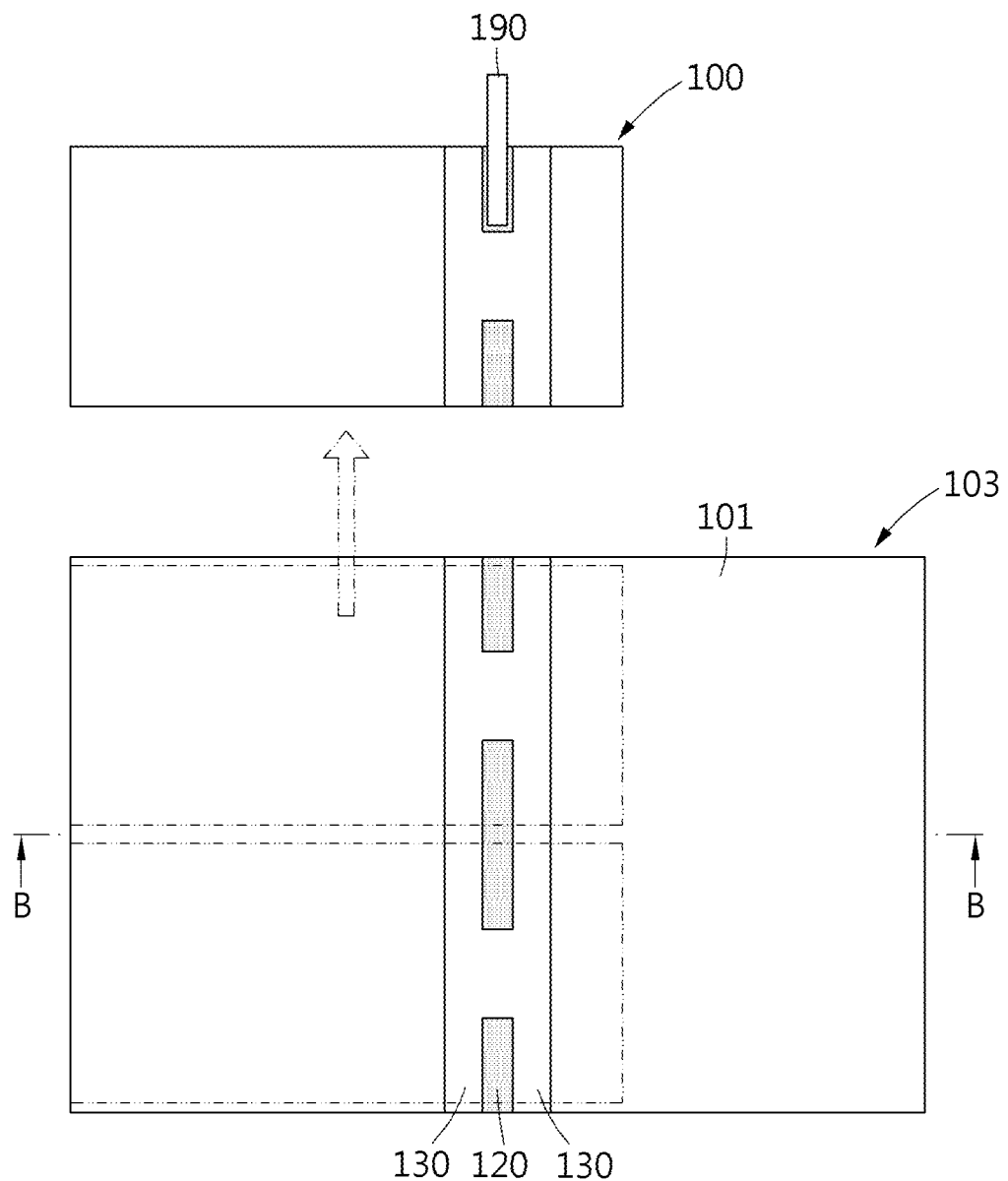
FIG. 2 is a plan view for describing a modification of the process of manufacturing a current collector for electrodes according to an embodiment of the present disclosure.
Figure 3A:
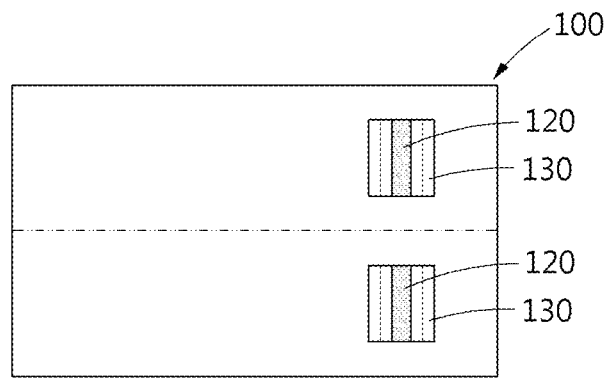
FIGS. 3A to 3C are views for describing modifications of a metal piece and an adhesive portion provided in the current collector for electrodes according to FIG. 1.
Figure 3B:
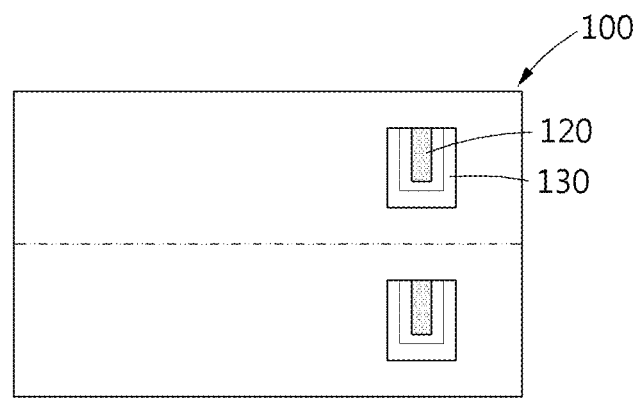
Figure 3C:
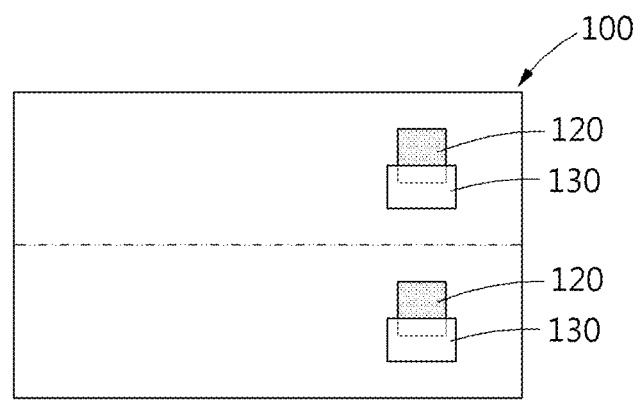
Figure 4A:
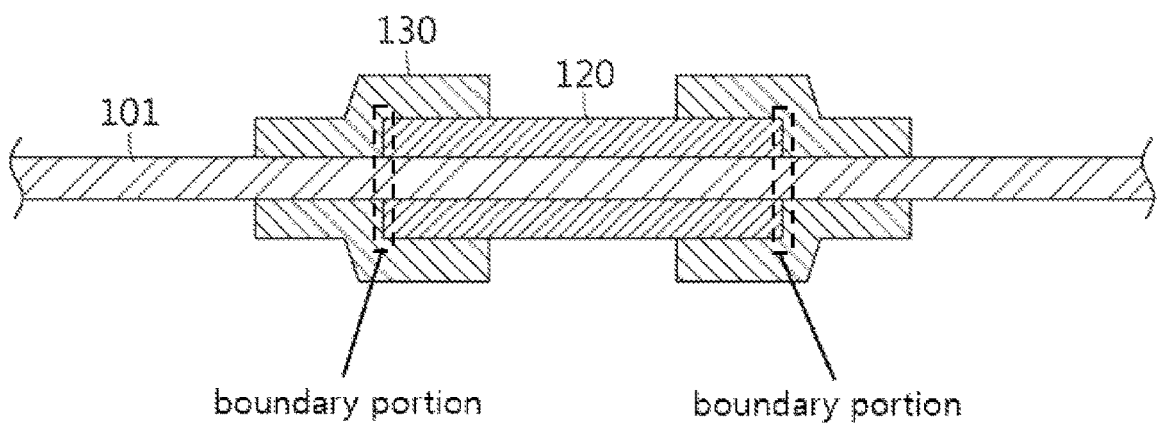
FIGS. 4A and 4B are cross-sectional views taken along cut line "A-A" of FIG. 1 and cut line "B-B" of FIG. 2.
Figure 4B:
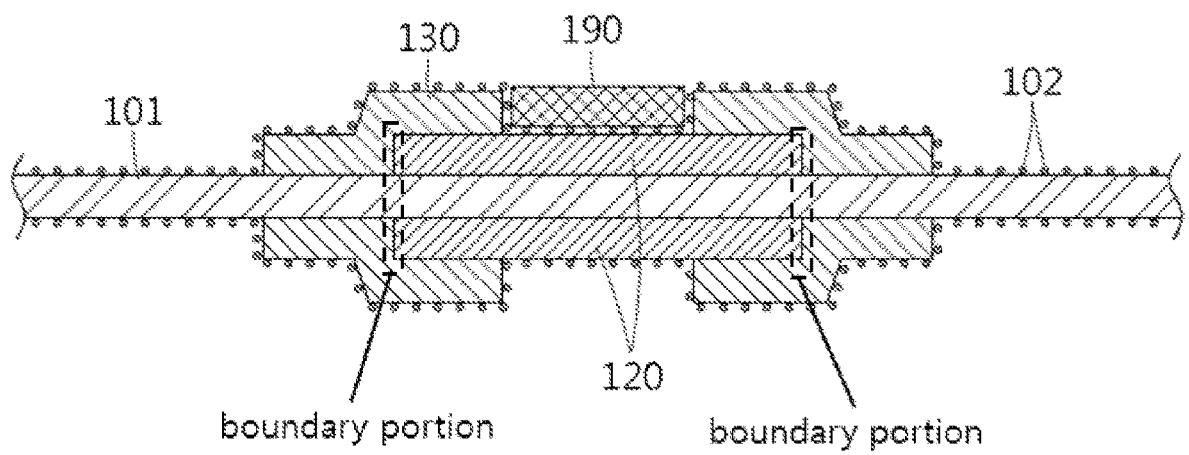

FIG. 1 is a plan view for describing a process of manufacturing a current collector for electrodes according to an embodiment of the present disclosure, FIG. 2 is a plan view for describing a modification of the process of manufacturing a current collector for electrodes according to an embodiment of the present disclosure, FIGS. 3A to 3C are views for describing modifications of a metal piece and an adhesive portion provided in the current collector for electrodes according to FIG. 1, and FIGS. 4A and 4B are cross-sectional views taken along cut line "A-A" of FIG. 1 and cut line "B-B" of FIG. 2.

Referring to FIGS. 1 to 8, since a current collector 100 for electrodes according to an embodiment of the present disclosure has a resistance value greater than a resistance of a current collector made of a metal foil, a limit current value of a current flowing through the current collector may be adjusted, and since a current flow may be disturbed by damage to a polymer film, a short-circuit current may be reduced when an internal short circuit of a secondary battery occurs.

As such, a lithium secondary battery having the current collector 100 for electrodes according to the present disclosure may have a property or concept of a max current limited battery (MCLB). Hereinafter, a current collector for electrodes according to the present disclosure that may implement the MCLB will be described.

In addition, the current collector for electrodes according to embodiments of the present disclosure to be described below is a concept including both a current collector for positive electrode (cathode, hereinafter cathode) and a current collector for negative electrode (herein after anode). In a structure for forming an electrode assembly of a type of winding the current collector for cathode and the current collector for anode, a current collector for electrodes and a method for manufacturing the same in the structure of forming a stack type electrode assembly in which the current collector for cathode and the current collector for anode are stacked as well as the structure of the current collector for electrodes will be described.

Figure 8A:
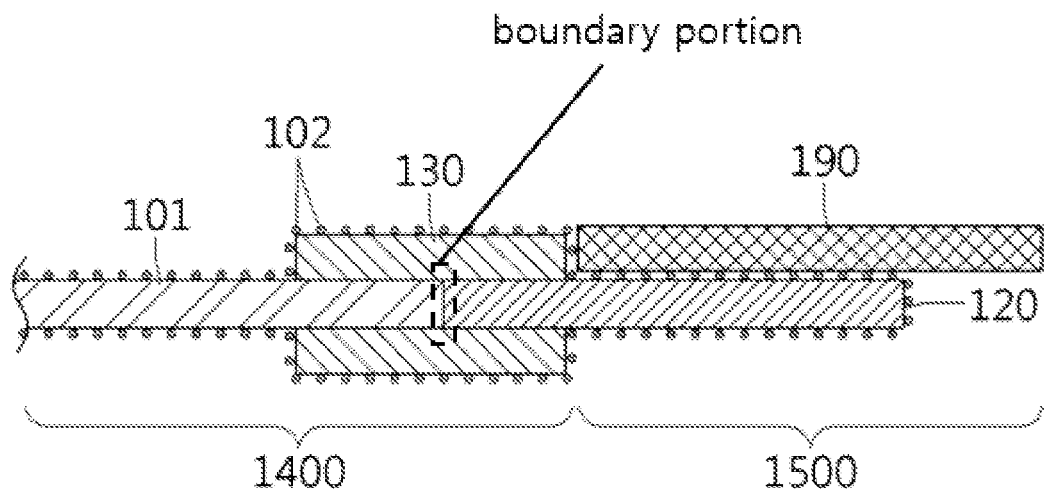
FIGS. 8A and 8B are cross-sectional views taken along cut lines "E-E" and "F-F" of FIGS. 7E and 7F.
Figure 8B:
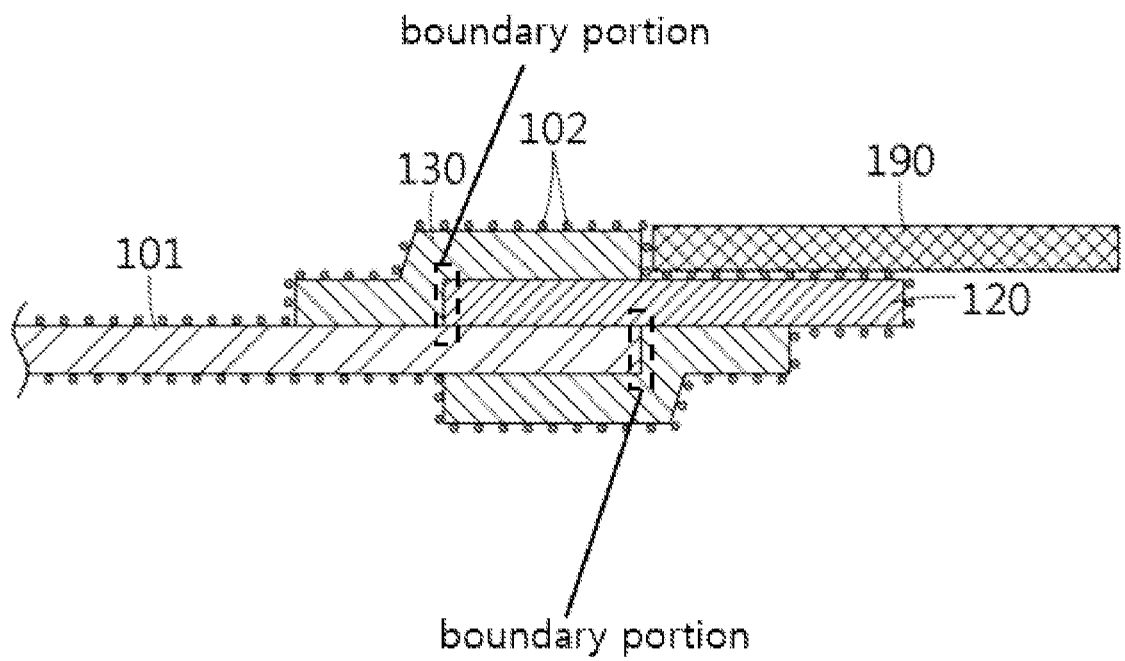
Figure 9:
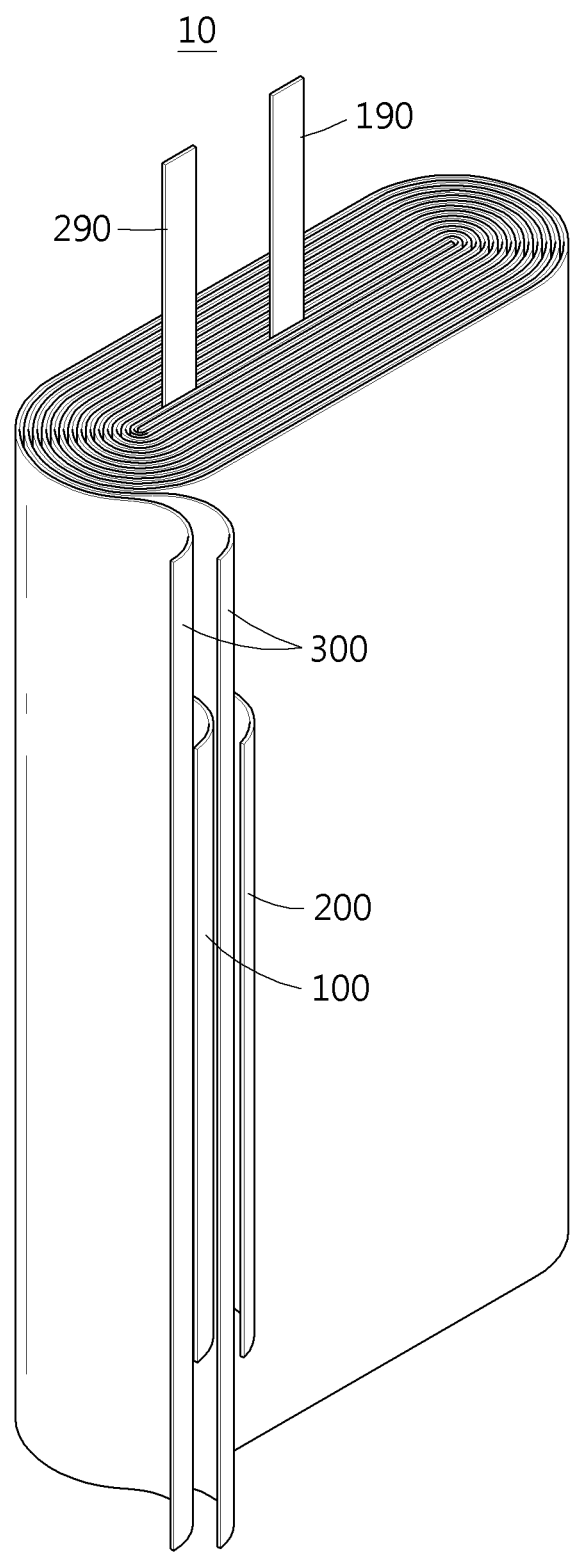
FIG. 9 is a perspective view for describing an electrode assembly formed by winding the current collector for electrodes according to the embodiment of the present disclosure and a separator.
Figure 10:
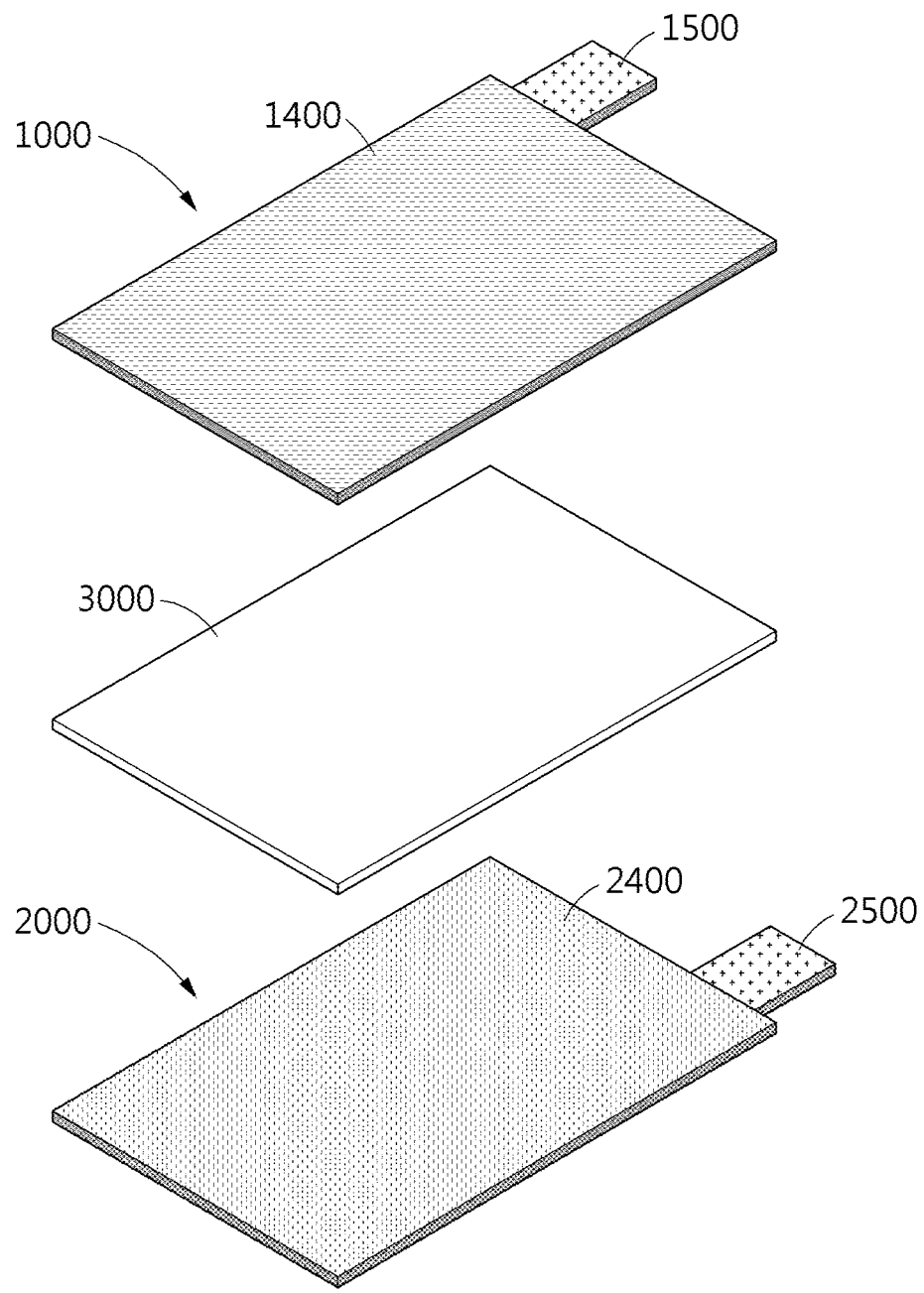
FIG. 10 is an exploded perspective view for describing the electrode assembly formed by stacking the current collector for electrodes according to an embodiment of the present disclosure and the separator.

Current collectors 100 and 1000 for electrodes described in FIGS. 1 to 8 are current collectors for cathode, reference numeral "200" in FIG. 9 denotes a current collector for anode, and reference numeral "2000" in FIG. 10 denotes a current collector for anode. For reference, FIGS. 9 and 10 are perspective views for describing an electrode assembly formed by winding the current collector for electrodes according to the embodiment of the present disclosure and a separator, and FIG. 10 is an exploded perspective view for describing the electrode assembly formed by stacking the current collector for electrodes according to an embodiment of the present disclosure and the separator.

Hereinafter, for the convenience of description, the current collector for cathode will be referred to as the current collectors 100 and 1000 for electrodes.

The current collector 100 for electrodes according to the present disclosure uses a polymer film 101 as a base material (base film) without using a metal foil, and is characterized in that a thin metal is applied or coated on the polymer film 101.

Referring to FIGS. 1 to 4B, the current collector 100 for electrodes according to the embodiment of the present disclosure may be formed by punching or cutting a coalesced polymer film (referred to as 'coalesced polymer film 103' to be distinguished from the non-coalesced polymer film 101) 103, in which electrode materials are integrally formed, along a shape (see a rectangle marked by a dotted line in FIGS. 1 and 2) of the current collector 100 for electrodes while transferring the coalesced polymer film 103 in one direction (loading direction).

Referring to FIG. 1, the coalesced polymer film 103 is continuously transferred (supplied) along one direction, and punched or cut in the shape of the current collector 100 for electrodes (see a dotted line) while being transferred to obtain the current collector 100 for electrodes. A punching hole (not illustrated) may be formed in the coalesced polymer film 103 punched or cut in the shape of the current collector 100 for electrodes.

Intervals between punching holes formed in the coalesced polymer film 103 to be transferred or the polymer film 101 to be described later, that is, holes remaining after the current collector 100 for electrodes is formed and adjacent punching holes are minimized to minimize the discarded coalesced polymer film 103, thereby increasing the productivity of the current collector 100 for electrodes.

Referring to FIGS. 1 to 4B, the current collector 100 for electrodes (current collector) according to the embodiment of the present disclosure may include the polymer film 101; a metal piece 120 provided on at least one of upper and lower surfaces of the polymer film 101 or one side of at least one of edges of the polymer film 101; an adhesive portion 130 provided on surfaces of the polymer film 101 and the metal piece 120 to cover a boundary portion of the polymer film 101 and the metal piece 120 to adhere the metal piece 120 to the surface the polymer film 101; and a conductive material 102 formed on the surfaces of the polymer film 101, the metal piece 120, and the adhesive portion 130.

Here, in the current collector 100 for electrodes according to the embodiment of the present disclosure, the metal piece 120 is a portion for connecting or attaching a lead tab 190. Here, the adhesive portion 130 is not provided between the metal piece 120 and the polymer film 101 in order to attach the metal piece 120 to the polymer film 101, but is provided on the upper surfaces of the metal piece 120 and the polymer film 101. That is, the adhesive portion 130 is an adhesive layer or adhesive means provided on the surfaces of the polymer film 101 and the metal piece 120 to cover the boundary portion between the polymer film 101 and the metal piece 120 in order to fix the metal piece 120 placed on the surface of the polymer film 101 to the polymer film 101. In this way, the adhesive portion 130 may be adhered to both the polymer film 101 and the metal piece 120 to fix the metal piece 120 to the polymer film 101.

The polymer film 101 is a base film that is the basis of the coalesced polymer film 103, and may be provided in a long band shape with a relatively small width to have a constant length. Here, the polymer film 101 may continuously form the current collector 100 for electrodes by being wound or unwound along a predetermined direction.

The polymer film 101 is preferably made of an insulator material such as polyethylene (PE), polypropylene (PP), polybutylene terephthalate (PBT), polyimide (PI), or polyethylene terephthalate (PET).

The polymer film 101 preferably has a thickness of 50 μm or less, preferably 1.4 μm or more, and 50 μm or less. The current collector 100 for electrodes according to the embodiment of the present disclosure may reduce a thickness or weight of a battery than when using the existing metal foil current collector. The polymer film 101 of the insulator having a thickness of 1.4 μm or more and 50 μm or less is used as a basic structure of the current collector 100, so it is possible to reduce the overall thickness or weight of the lithium secondary battery having the current collector 100 for electrodes according to the embodiment of the present disclosure.

Meanwhile, the lead tab 190 is adhered or fixed to the metal piece 120 by welding. When the polymer film 101 does not melt at a temperature lower than a welding temperature of the lead tab 190, the lead tab 190 may not be adhered. Therefore, the polymer film 101 preferably has a melting point that may be melted in the process of welding the lead tab 190.

Referring to FIGS. 1 to 4B, a conductive material 102, an electrode active material layer (not illustrated), etc. are formed on both the upper and lower surfaces of the polymer film 101, and in some cases, may be formed only on either the upper surface or the lower surface of the polymer film 101. Hereinafter, the current collector 100 for electrodes manufactured from the coalesced polymer film 103 in which the conductive material 102, the electrode active material layer, etc. are formed on the upper and lower surfaces of the polymer film 101 will be described.

The metal piece 120 may serve to secure a position for welding the lead tab 190 on the polymer film 101. That is, the metal piece 120 may serve as a connection portion of the lead tab 190.

The metal piece 120 is preferably formed to have a thickness of 5 μm or more. Here, it is sufficient that the metal piece 120 is provided only in a portion of the polymer film 101. Referring to FIGS. 1 and 2, the metal piece 120 is preferably provided in a long band shape on the surface of the polymer film 101.

As described above, the metal piece 120 preferably has a shape of a metal thin film or a metal foil having a thickness of 5 μm or more, but is not limited thereto. The metal piece 120 may be provided in the form of a thin film, a foil, or a mesh and may be electrically connected to the lead tab 190 to be described later.

The metal piece 120 of the current collector 100 for electrodes according to the embodiment of the present disclosure serves as an electric pass to secure the welding position of the lead tab 190 or to secure conductivity when a length of the polymer film 101 is long.

Meanwhile, in order to fix or attach the metal piece 120 to the surface of the polymer film 101, the adhesive portion 130 may be formed on the surfaces of the polymer film 101 and the metal piece 120 to cover the boundary portion of the polymer film 101 and the metal piece 120.

The adhesive portion 130 may be made of a material having an adhesive component such as vinyl alcohol (VA), ethylene vinyl acetate (EVA), acrylate, acid modified PP, or an epoxy-based adhesive, and preferably has a thickness of less than 30 μm.

Here, the adhesive portion 130 may be formed of a combination of two or more layers of polymer together with the above-described polymer. For example, the adhesive portion 130 is made of an insulator material, such as polyethylene (PE), polypropylene (PP), or polyethylene terephthalate (PET), as an upper layer, and a material having the above-described adhesive component provided on a lower layer thereof.

In addition, the adhesive portion 130 may be a polymer layer formed of a polymer material. Here, the adhesive portion 130 or the polymer layer may be provided over the entire surface of the metal piece 120 or may be provided to cover only a portion of the surface of the metal piece 120.

The adhesive portion 130 may be attached to the polymer film 101 and the metal piece 120 by heat to cover the boundary portion of the polymer film 101 and the metal piece 120. For example, the adhesive portion 130 may be adhered to the polymer film 101 and the metal piece 120 in a state where the adhesive component of the adhesive portion 130 is melted by applying heat.

Meanwhile, a surface treatment including a chromate treatment may be performed on one surface of the metal piece 120 facing the adhesive portion 130. The surface treatment is essential on the surface of the metal piece 120, and before attaching the metal piece 120 to the polymer film 101, chrome coating (chromate treatment) or Non-Cr treatment (non-chromate treatment or binder treatment) may be performed on the surface of the metal piece 120 or both of them may be simultaneously performed on the surface of the metal piece 120.

Here, the Non-Cr treatment is to coat a compound layer containing zirconium (Zr) or a compound layer containing silicon (Si) on the surface of the metal piece 120. The thickness of the chromate treatment and the Non-Cr treatment is preferably several nm to several tens of nm.

The thickness of the portion where the metal piece 120 is provided in the polymer film 101 is preferably 120 μm or less including the metal piece 120, and the thickness of the portion without the metal piece 120 or the portion without the metal piece 120 is preferably 100 μm or less.

Meanwhile, the current collector 100 for electrodes according to the embodiment of the present disclosure may include the conductive material 102 provided on the surfaces of the polymer film 101, the metal piece 120, and the adhesive portion 130.

The conductive material 102 may be made of metal such as copper (Cu), nickel (Ni), and aluminum (Al), or a conductive material such as carbon nanotube (CNT) or graphene, and may be formed in a plated or coated state on the surface of the polymer film 101. Accordingly, the conductive material 102 may be referred to as a conductive layer forming a portion of an outer surface of the current collector 100.

The conductive material 102 may be formed to adjust or lower a limit current or a maximum current of the current collector 100 for electrodes. In other words, the conductive material 102 may refer to metal or conductive material plated or coated on the surfaces of the polymer film 101, the metal piece 120, and the adhesive portion 130 to control the conductivity of the current collector 100 for electrodes, and the conductive material 102 may be referred to as a conductive layer when focusing on the plated or coated state on the surface of the polymer film 101, the metal piece 120, and the adhesive portion 130. Hereinafter, it is revealed that the conductive material 102 is a concept including the conductive layer.

By controlling the coating amount or coating thickness of the conductive material 102 plated or coated on the surfaces of the polymer film 101, the metal piece 120, and the adhesive portion 130, it is possible to control or lower the maximum amount of current flowing through the current collector 100 for electrodes, thereby making it possible to increase the safety of the lithium secondary battery and secure the safety of the battery in the event of the short circuit.

In other words, the limit current or the maximum current flowing through the current collector 100 for electrodes may be controlled by the thickness or amount of the conductive material 102 formed on the surfaces of the polymer film 101, the metal piece 120, and the adhesive portion 130. As such, the concept of the maximum current limited battery (MCLB) of the lithium secondary battery by the conductive material 102 of the current collector 100 for electrodes according to the embodiment of the present disclosure may be implemented. In addition, when a physical internal short circuit occurs, the polymer film 101 may be melt to prevent the sudden generation of current, thereby improving the safety of the battery.

The conductive material 102 may be formed on the surfaces of the polymer film 101, the metal piece 120, and the adhesive portion 130 by various methods. For example, when the conductive material 102 is metal, the conductive material 102 may be formed on the surfaces of the polymer film 101, the metal piece 120, and the adhesive portion 130 by sputtering, evaporation coating, or electroless plating. In addition, the conductive material 102 may be plated or coated by at least two of sputtering, evaporation coating, electroless plating, or electroplating.

Since the conductivity of the current collector 100 for electrodes may be controlled or the safety of the battery may be secured by the amount (weight) or thickness of the conductive material 102 being plated or coated, when the plating or coating is performed, it is necessary to use a method that may control or adjust the thickness or weight of the conductive material 102.

When the conductive material 102 is metal, it is preferable to use both the sputtering and electroplating to control the plating or coating thickness or weight of the conductive material 102. That is, after the conductive material 102 is thinly plated or coated on the surfaces of the polymer film 101, the metal piece 120, and the adhesive portion 130 by using the sputtering, the plating thickness or weight of the conductive material 102 may be easily controlled or adjusted while forming the conductive material 102 thereon again by using the electroplating.

Since the sputtering method is more expensive than the electroplating method, the conductive material 102 is thinly plated using the sputtering, and then the conductive material 102 is plated using the electroplating. In this way, using the sputtering and electroplating together is advantageous in terms of economical efficiency, and the thickness or weight of the conductive material 102 may be easily adjusted.

The conductive material 102 may be formed on only one surface of the upper and lower surfaces of the polymer film 101 or formed on both the surfaces of the polymer film 101. At this time, the conductive material 102 is preferably formed to have a thickness of 0.2 μm based on the minimum cross section and a thickness of 2.5 μm based on the maximum cross section.

Meanwhile, the conductive material 102 formed on the surface of the polymer film 101 may be plated or coated on the surface of the polymer film 101, or the conductive material 102 formed on the surface of the polymer film 101 may penetrate or pass through the inside of the polymer film 101. For example, when the polymer film 101 is made of a porous material, the conductive material 102 plated or coated on one surface of the surfaces of the polymer film 101 may reach the other surface through pores of the polymer film 101.

In the case of plating or coating the conductive material 102 using the electroless plating method, even if the conductive material 102 is plated or coated only on one surface of the porous polymer film 101, since the conductive material 102 permeates into the polymer film 101 and reaches the other side, the conductivity may be secured on both surfaces of the polymer film 101 even when the conductive material 102 is plated or coated on only one surface of the polymer film 101.

In addition, since the conductive material 102 is plated or coated after the metal piece 120 is attached to the polymer film 101, the conductive material 102 may be plated or coated even on the surface of the metal piece 120 as well as the surface of the polymer film 101. At this time, when the metal piece 120 is a thin film metal foil or a metal mesh type and the polymer film 101 is a porous material, the conductive material 102 formed on the surface of the metal piece 120 may pass through the inside of the metal piece 120 and reach the other surface of the polymer film 101.

However, there are cases where it is necessary to remove the pores of the polymer film 101, which is made of a porous material. In this case, when the electroless plating is performed to plate or coat the conductive material 102, the polymer film 101 is pressed or heated to remove the pores after the electroless plating is performed.

As described above, the conductive material 102 may be made of metal or a conductive material, formed in the plated or coated state on the surface of the polymer film 101, and formed to control or lower the limit current or the maximum current of the current collector 100 for electrodes.

In the current collector 100 for electrodes according to the embodiment of the present disclosure, since a current can flow by the conductive material 102, the state where the conductive material 102 is plated or coated on the surface of the polymer film 101 should be maintained well. For this purpose, it is preferable to increase the bonding strength between the conductive material 102 and the polymer film 101 by the surface treatment of the polymer film 101.

When the bonding strength between the conductive material 102 and the polymer film 101 is not good, since the conductive material 102 may be separated or detached from the surface of the polymer film 101 while an electrolyte is injected, it is important to increase the bonding strength between the conductive material 102 and the polymer film 101.

The surface treatment for increasing the adhesion or bonding strength with the conductive material 102 may be performed on the surface of the polymer film 101.

In order to increase the bonding strength between the conductive material 102 and the polymer film 101, corona treatment or Ni/Cr treatment may be performed on the surface of the polymer film 101. Here, when performing the Ni/Cr treatment, it is preferable that Ni or Cr or a Ni/Cr alloy is coated on the polymer film 101 in a thickness of 10 nm or less.

For example, when the conductive material 102 plated on the surface of the polymer film 101 is copper (Cu), in order to improve the bonding strength between copper and the polymer film 101, the Ni or Cr or the Ni/Cr alloy is coated on the surface of the polymer film 101 to a thickness of 10 nm or less and copper is coated on the Ni/Cr treated surface, so it is possible to increase the bonding strength between copper as the conductive material 102 and the polymer film 101. That is, by first coating Ni/Cr on the polymer film 101 and then coating copper thereon, the bonding strength between copper as the conductive material 102 and the polymer film 101 may increase.

In addition, by coating chromium (Cr) on the surface of copper, which is the conductive material 102, plated on the surface of the polymer film 101 to a thickness of 10 nm or less, it is possible to improve the bonding strength of a binder.

In order to strengthen the corrosion resistance of aluminum, which is the conductive material 102, chromate treatment of coating chromium (Cr) may be performed on aluminum, and in order to increase the adhesion, a treatment of coating epoxy-type Non-Cr may be performed on the chromate treatment. Here, the Non-Cr treatment is to coat a compound layer containing zirconium (Zr) or a compound layer containing silicon (Si). The thickness of the chromate treatment and the Non-Cr treatment is preferably several nm to several tens of nm.

In addition, in order to improve the adhesion of the conductive material 102, a treatment of coating a polymer-type Non-Cr may be performed on a surface of nickel. Here, the Non-Cr coating layer is in a state where metal is dispersed in a polymer. The thickness of the Non-Cr treatment is preferably several nm.

Meanwhile, in the current collector 100 for electrodes according to the embodiment of the present disclosure, the electrode active material layer (not illustrated) may be plated or coated on the surface of the conductive material 102. The electrode active material layer may be an electrode layer having electrical characteristics according to the polarity of the current collector 100 for electrodes. When the current collector 100 for electrodes has a polarity of a cathode, the electrode active material layer may be plated or coated with a positive electrode (cathode) active material, and when the current collector 100 for electrodes has a polarity of an anode, the electrode active material layer may be plated or coated with a negative electrode (anode) active material.

Here, unlike the conductive material 102, the electrode active material layer is preferably not formed on the metal piece 120. In other words, it is preferable that the electrode active material layer is not formed on the surface of the conductive material 102 that is plated or coated on the surface of the metal piece 120.

Meanwhile, the current collector 100 for electrodes according to the embodiment of the present disclosure may include the lead tab 190 for connection with an external device.

The existing metal foil current collector may directly weld the lead tab to the metal foil, but in the current collector 100 for electrodes according to the embodiment of the present disclosure, since the configuration corresponding to the existing metal foil is the polymer film 101, it is not possible to directly weld the lead tab to the polymer film 101. The current collector 100 for electrodes according to the embodiment of the present disclosure may solve this problem by attaching the metal piece 120 to the surface of the polymer film 101, and welding the lead tab 190 to the metal piece 120.

In the current collector 100 for electrodes according to the embodiment of the present disclosure, the lead tab 190 may be welded to the metal piece 120 by ultrasonic welding, laser welding, or spot welding.

As illustrated in FIGS. 4A and 4B, the metal piece 120 and the conductive material 102 are provided on both surfaces of the polymer film 101, and the metal pieces 120 provided on both surfaces of the polymer film 101 may be formed at the same position.

Here, the metal pieces 120 are positioned on both the upper and lower surfaces of the polymer film 101, and it may be seen that the metal piece 120 is provided at the same or symmetrical position. After the metal piece 120 is attached to the same position on both the upper and lower surfaces of the polymer film 101 by the adhesive portion 130, the conductive material 102 may be plated or coated on the surfaces of the polymer film 101, the metal piece 120, and the adhesive portion 130. At this time, the conductive material 102 may be plated or coated on both the upper and lower surfaces of the polymer film 101, and the conductive material 102 may also be plated or coated even on the surfaces of the metal piece 120 and the adhesive portion 130 provided on both the upper and lower surfaces of the polymer film 101.

Referring to FIG. 4B, the lead tab 190 may be connected to any one of the metal pieces 120 provided on both the upper and lower surfaces of the polymer film 101. The lead tab 190 may be connected to the metal piece 120 in the state where the conductive material 102 is applied or coated on the surface of the metal piece 120.

When the lead tab 190 is welded to any one of the metal pieces 120 provided on both the surfaces of the polymer film 101, the polymer film 101 may be melted, and thus, the metal pieces 120 provided on both the surfaces of the polymer film 101 are connected to each other, so the lead tab 190 may be electrically connected to the conductive material 102 provided on both the surfaces of the polymer film 101 at the same time.

In the state where the metal piece 120 and the conductive material 102 are provided on the upper and lower surfaces of the polymer film 101, the lead tab 190 is ultrasonic-welded, laser-welded, or spot-welded to the metal piece 120 provided on the upper surface of the polymer film 101, so the polymer film 101 is partially melted. When the welding heat generated when welding the lead tab 190 is higher than the melting point of the polymer film 101, the polymer film 101 may be melted during the welding process.

As such, since the polymer film 101 does not exist in the melted portion of the polymer film 101, the upper and lower metal pieces 120 may directly contact each other. At this time, since the metal piece 120 is also molten by the welding heat, the upper and lower metal pieces 120 are joined together. Therefore, since the upper and lower metal pieces 120 are directly melted and bonded to each other in the portion where the polymer film 101 is melted and disappeared, the lead tab 190 welded to any one of the metal pieces 120 may be electrically connected to the conductive materials 102 formed on the upper and lower surfaces of the polymer film 101 as well as the upper and lower metal pieces 120.

The current collector 100 for electrodes according to the embodiment of the present disclosure may connect the lead tab 190 since the metal piece 120 maintains a state connected to the polymer film 101 even if a portion of the polymer film 101 is melted by the welding heat.

However, in some cases, even in the state where the polymer film 101 is not melted, the lead tab 190 may be welded to the metal piece 120. When the polymer film 101 is a porous material, since the conductive material 102 penetrates the polymer film 101 through the pores and is electrically connected to both surfaces of the polymer film 101, the lead tab 190 connected to the metal piece 120 may be electrically connected to the conductive material 102 of the polymer film 101 in the state where the polymer film 101 is not melted.

Meanwhile, referring to FIG. 1, the adhesive portion 130 may be attached to the surfaces of the polymer film 101 and the metal piece 120 to cover a longitudinal edge of the metal piece 120 provided on the surface of the polymer film 101. In this case, a portion of the width of the adhesive portion 130 in the longitudinal direction may be attached to the surface of the polymer film 101 and the remaining portion thereof may be provided to be attached to the surface of the metal piece 120. In such a state, when the polymer film 101 is cut or punch along the shape of the current collector for electrodes, the current collector 100 for electrodes may be obtained. In FIG. 1, a rectangle indicated by a dotted line on the coalesced polymer film 103 represents the shape of the current collector for electrodes. Several current collectors for electrodes may be obtained from one coalesced polymer film 103.

The current collector 100 for electrodes illustrated in FIG. 1 may be provided such that the lead tab 190 connected to the metal piece 120 protrudes outward of the longitudinal edge of the current collector 100 for electrodes. The current collector 100 for electrodes having such as shape is wound as illustrated in FIG. 9 to obtain the electrode assembly 10. In FIG. 9, reference numeral "200" denotes a current collector for anode, reference numeral "290" denotes a negative electrode (anode) lead tab, and reference numeral "300" denotes a separator.

Referring to FIG. 2, it may be seen that the shape of the adhesive portion 130 is different from that of FIG. 1. In the case of FIG. 1, the adhesive portions 130 are provided on both sides of the metal piece 120 in the width direction and separated from each other. In the case of FIG. 2, there is a difference in that the adhesive portions 130 are positioned on both sides of the metal piece 120 in the width direction and there are portions connected to each other.

The current collector 100 for electrodes obtained from the coalesced polymer film 103 illustrated in FIG. 2 may also be used to configure the winding type electrode assembly 10 as illustrated in FIG. 9.

Meanwhile, in the case of the current collector 100 for electrodes illustrated in FIGS. 1 to 3C, it is preferable that the edge of the metal piece 120 to which the lead tab 190 is connected is provided at a position that does not protrude outward from the edge of the polymer film 101, or provided inside from the edge of the polymer film 101. In this way, the current collector 100 for electrodes provided at a position where the edge of the metal piece 120 to which the lead tab 190 is connected does not protrude outward from the edge of the polymer film 101 may form the winding type electrode assembly 10.

Here, the shapes of the current collector 100 for electrodes illustrated in FIGS. 1 and 2 are different from each other, and the position of the adhesive portion 130 may be different with respect to the metal piece 120. For example, as illustrated in FIG. 3A, the adhesive portions 130 may be positioned on both sides of the metal piece 120 in the width direction, respectively, as illustrated in FIG. 3B, all of the adhesive portions 130 may be positioned at the other edges except for only any one side of the metal piece 120, or as illustrated in FIG. 3C, the adhesive portion 130 may be positioned at only one side of the metal piece 120. As illustrated in FIGS. 3A to 3C, the metal piece 120 positioned inside from the edge of the polymer film 101 and the adhesive portion 130 provided to cover the boundary portion of the polymer film 101 may be provided at at least one of the other edges except for the edge of the metal piece 120 in the direction in which the lead tab 190 extends from the metal piece 120.

The current collector 100 for electrodes illustrated in FIGS. 1 to 3C is wound to form the winding type electrode assembly 10 (see FIG. 9), so the lead tab 190 connected to the metal piece 120 should be exposed from one side of the electrode assembly 10. Therefore, it is preferable that the adhesive portion 130 is not adhered to the edge of the metal piece 120 in the direction in which the lead tab 190 is exposed.

FIGS. 4A and 4B are cross sections of the coalesced polymer film 103 illustrated in FIGS. 1 and 2. FIG. 4A is a cross section before the conductive material 102 is coated or applied to the surface of the coalesced polymer film 103, and FIG. 4B is a cross section after the conductive material 102 is coated or applied to the surface of the coalesced polymer film 103.

Referring to FIG. 4B, after sequentially attaching the metal piece 120 and the adhesive portion 130 to the surface of the polymer film 101, the conductive material 102 is coated and applied to the surfaces of the polymer film 101, the metal piece 120, and the adhesive portion 130. That is, the conductive material 102 is also present on the surface of the adhesive portion 130. However, since the lead tab 190 is connected to the metal piece 120 after the conductive material 102 is applied, it is preferable that the conductive material 102 does not exist on the surface of the lead tab 190.

A method of manufacturing a current collector 100 for electrodes will be described with reference to FIGS. 1 to 4B.

The present disclosure may provide the method of manufacturing a current collector 100 for electrodes including: preparing the polymer film 101; providing the metal piece 120 on at least one of the upper and lower surfaces of the polymer film 101; providing the adhesive portion 130 on the surfaces of the polymer film 101 and the metal piece 120 along a longitudinal edge of the metal piece 120; and forming the conductive material 102 on the surfaces of the polymer film 101, the metal piece 120 and the adhesive portion 130.

Here, in the providing of the adhesive portion 130, the adhesive portion 130 may be provided to cover the boundary portion between the polymer film 101 and the metal piece 120 on at least one of both sides of the metal piece 120 in the width direction. Referring to FIGS. 4A and 4B, the adhesive portion 130 may be provided to cover the boundary portion between the metal piece 120 and the polymer film 101, that is, the edge of the metal piece 120 in the width direction, and may be provided to partially cover the surface of the metal piece 120 and at the same time also partially cover the surface of the polymer film 101. However, in the case of FIGS. 4A and 4B, the adhesive portion 130 is adhered to the metal piece 120 and the polymer film 101 at both sides of the metal piece 120 in the width direction, that is, at two locations, but may be adhered to the metal piece 120 and the polymer film 101 at one or three locations as illustrated in FIGS. 3A to 3C.

Meanwhile, in the providing of the adhesive portion 130, the adhesive portion 130 may be provided on both sides of the metal piece 120 in the width direction at regular intervals (see FIG. 1), or the adhesive portions 130 provided on both sides of the metal piece 120 in the width direction may be provided on the surface of the metal piece 120 to be connected to each other in at least one portion (see FIG. 2).

As in the state as illustrated in FIGS. 1 and 2, the obtaining of the current collector 100 for electrodes may be performed by punching or cutting the coalesced polymer film 103 along the shape (see a rectangle marked by a dotted line) of the current collector 100 for electrodes while the coalesced polymer film 103 is transferred in any one direction. In this case, the obtained current collector 100 for electrodes may be used to manufacture the winding type electrode assembly 10.

Meanwhile, FIGS. 5A to 5E are diagrams for describing a process of manufacturing a current collector for electrodes according to another embodiment of the present disclosure. Comparing FIGS. 1 and 2 with FIGS. 5A to 5E, there is a difference in the shape of the polymer film 101. A plurality of perforations 101a may be formed in a line in the polymer film 101 (see FIG. 5A). That is, in the providing of the polymer film 101, the plurality of perforations 101a may be formed in a line in the polymer film 101. In this case, it is preferable that the plurality of perforations 101a is formed in a line in the polymer film 101 to match the longitudinal direction of the metal piece 120.

Figure 5A:
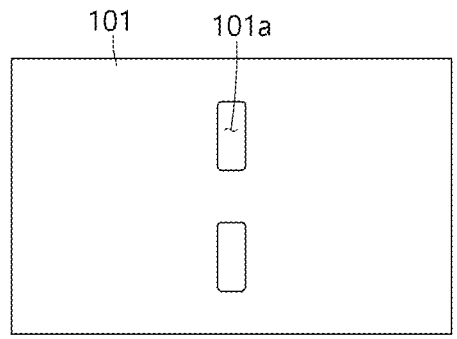
FIGS. 5A to 5E are diagrams for describing a process of manufacturing a current collector for electrodes according to another embodiment of the present disclosure.
Figure 5B:
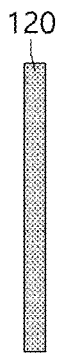
Figure 5C:
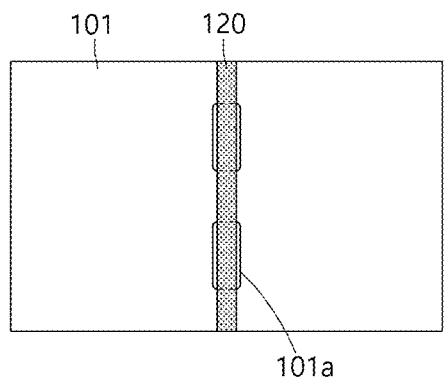
Figure 5D:
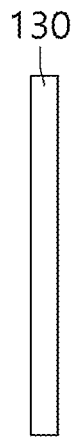

In the providing of the metal piece 120 on at least one of the upper and lower surfaces of the polymer film 101, the metal piece 120 may be provided on at least one of the upper and lower surfaces of the polymer film 101 to cover the plurality of perforations 101a (see FIG. 5C). Here, the plurality of perforations 101a formed in the polymer film 101 may be formed so that the width in the longitudinal direction is not smaller than the width of the metal piece 120. By making the width of the perforation 101a greater than or equal to the width of the metal piece 120, the metal piece 120 is located inside the perforation 101a, so in the portion where the perforation 101a is formed, the thickness of the coalesced polymer film 103 does not increase due to the metal piece 120.

Figure 5E:
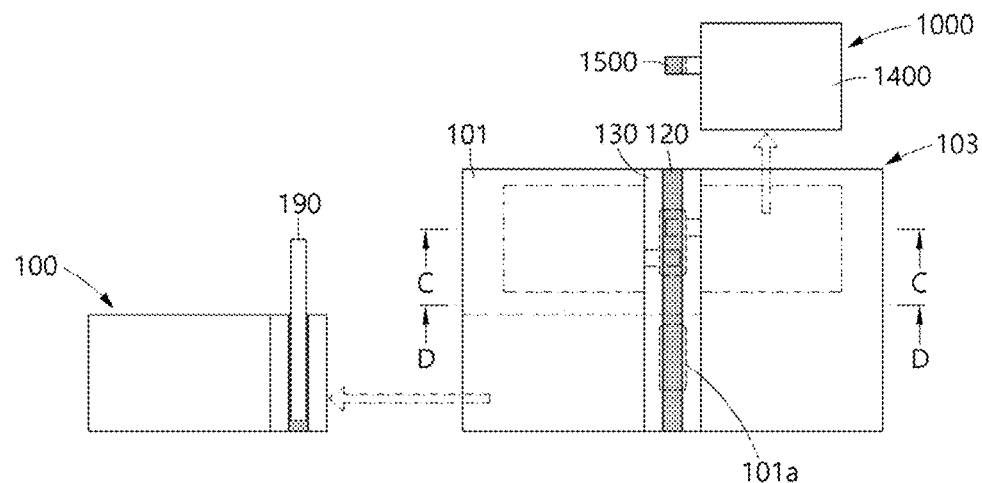
Figure 6A:
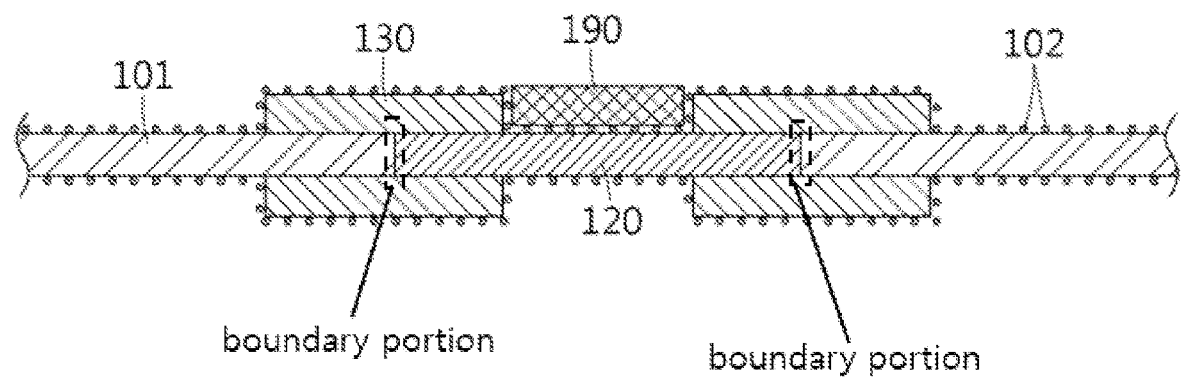
FIGS. 6A and 6B are cross-sectional views taken along cut lines "C-C" and "D-D" of FIG. 5E.
Figure 6B:
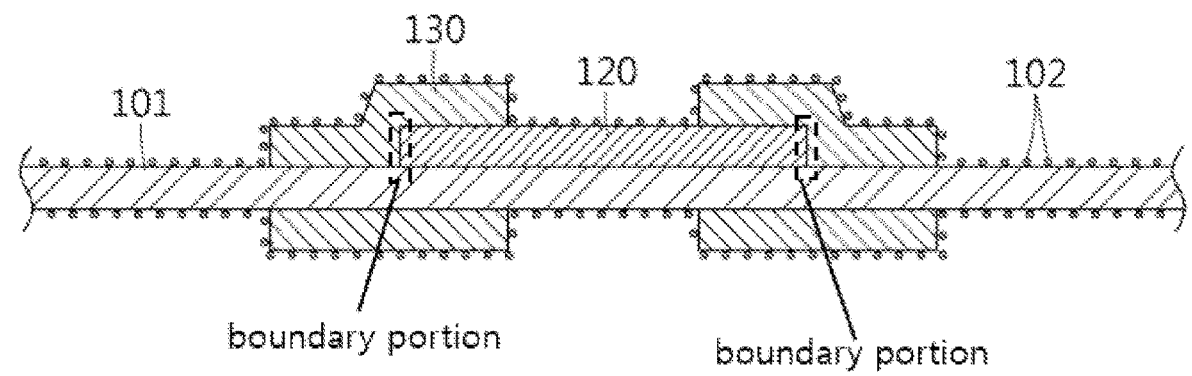

FIGS. 6A and 6B are cross-sectional views taken along cut lines "C-C" and "D-D" of FIG. 5E. That is, FIGS. 6A and 6B are cross-sectional views illustrating a cross section shape in a direction orthogonal to the metal piece 120 and the adhesive portion 130.

FIG. 6A is a cross-sectional view of a portion where the adhesive portion 130 is adhered after the metal piece 120 is positioned to cover the perforation 101a, and FIG. 6B is a cross-sectional view of the adhesive portion 130 in a state where the metal piece 120 is positioned on the surface of the polymer film 101 without the perforation 101a.

In the case of FIG. 6A, since the metal piece 120 is located inside the perforation 101a, the metal piece 120 is located between the polymer films 101, so the thickness of the coalesced polymer film 103 does not increase even when the metal piece 120 is provided. On the other hand, in the case of FIG. 6B, since the metal piece 120 is located on the surface of the polymer film 101, the metal piece is located on any one of the upper and lower surfaces of the polymer film 101, and the thickness of the coalesced polymer film 103 more increases than the case of FIG. 6A.

After the metal piece 120 is positioned to cover the perforation 101a, the adhesive portion 130 is positioned on at least one of both sides of the metal piece 120 in a width direction to adhere the metal piece 120 and the polymer film 101. Then, the coalesced polymer film 103 illustrated in FIG. 5E is obtained.

Unlike the coalesced polymer film 103 illustrated in FIGS. 1 and 2, two types of current collectors for electrodes may be obtained in the coalesced polymer film 103 illustrated in FIGS. 5A to 5E. That is, not only the current collector 100 for electrodes used in the winding type electrode assembly 10, but also a current collector 1000 for electrodes used in a stacked or stack type electrode assembly 10-1 (see FIG. 10) may also be obtained.

Referring to FIGS. 5A to 5E, the shapes of the current collector 100 for electrodes used in the winding type electrode assembly 10 and the current collector 1000 for electrodes used in the stack type electrode assembly 10-1 are different.

Here, when the two types of current collectors 100 and 1000 for electrodes are punched or cut from the coalesced polymer film 103, in the two types of current collectors 100 and 1000 for electrodes, in the state where a portion of the metal piece 120 to which the lead tab 190 is connected is located in the perforation 101a, the current collectors 100 and 1000 for electrodes may be obtained by being punched or cut according to the shape of the current collector for electrodes (see a rectangle marked by a dotted line). In this way, since the current collectors 100 and 1000 for electrodes are manufactured so that the metal piece 120 to which the lead tab 190 is connected is located within the perforation 101a, there is an advantage that the overall thickness of the portion connecting the lead tab 190 does not increase as shown in FIG. 6A.

Meanwhile, the current collector 1000 for electrodes used in the stack type electrode assembly 10-1 may include an electrode part 1400 in which the electrode active material layer is formed, and a tab part 1500 in which the electrode active material layer is not formed. The electrode part 1400 and the tab part 1500 are integrally formed, but have different cross-sectional structures.

As described above, it is preferable that the tab part 1500, which is an important component of the metal piece 120, protrudes from any one edge of the electrode part 1400. Here, the tab part 1500 may be referred to as a "plain protrusion". The "plain protrusion" means a portion protruding from the electrode part 1400 without the electrode active material layer being formed.

FIG. 10 is an exploded perspective view illustrating a process of alternately stacking the current collector 1000 for electrodes to form the stack type electrode assembly 10-1. In FIG. 10, the current collector 1000 for electrodes is a cathode current collector, reference numeral "2000" denotes a current collector for anode, and reference numeral "3000" denotes a separator. A current collector 2000 for an anode has the same structure as the current collector 1000 for electrodes (for a cathode) and may be manufactured by the same process. However, the components of the current collector 1000 for a cathode, the conductive material 102, and the electrode active material layer are different.

Referring to FIG. 10, the current collector 2000 for an anode may also include an electrode part 2400 and a tab part 2500. The electrode assembly 10-1 may be obtained by stacking the current collector 1000 for cathode and the current collector 2000 for anode so that the separator 3000 is positioned therebetween. In this case, it is preferable that the tab part 1500 of the current collector 1000 for a cathode and the tab part 2500 of the current collector 2000 for an anode do not overlap each other.

Meanwhile, in the case of the current collector 1000 for electrodes used in the stack type electrode assembly 10-1, the current collector 1000 for electrodes is punched or cut from the coalesced polymer film 103 in the state where the tab part 1500 is located in the perforation 101a portion formed in the polymer film 101.

Even in the case of FIGS. 5A to 5E, the edge of the metal piece 120 to which the lead tab 190 is connected may be provided at a position that does not protrude outward from the edge of the polymer film 101. More precisely, the edge of the metal piece 120 to which the lead tab 190 is connected is located inside from the edge of the polymer film 101.

As illustrated in FIGS. 5A to 5E, when the electrode assemblies 100 and 1000 are manufactured using the polymer film 101 having the plurality of perforations 101a formed therein, since it is possible to manufacture not only the current collector 100 for electrodes used in the winding type electrode assembly 10 but also the current collector 1000 for electrodes used in the stack type electrode assembly 10-1, there is an advantage in that there is no need to separately prepare the required coalesced polymer film 103 according to the winding type and stack type electrode assembly.

FIGS. 7A to 7F are diagrams for describing a process of manufacturing a current collector for electrodes according to still another embodiment of the present disclosure. A method of manufacturing a current collector 1000 for electrodes illustrated in FIGS. 7A to 7F will be described.

The present disclosure may provide the method of manufacturing a current collector for electrodes including: preparing the polymer film 101; providing the metal piece 120 on at least one side of the edges of the polymer film 101; providing the adhesive portion 130 on at least one of the upper and lower surfaces of the polymer film 101 and the metal piece 120 along the longitudinal edge of the metal piece 120 to cover the boundary portion between the polymer film 101 and the metal piece 120; and forming the conductive material 102 on the surfaces of the polymer film 101, the metal piece 120, and the adhesive portion 130.

The polymer film 101 and the metal piece 120 use the same shape as the case illustrated in FIGS. 1 and 2. However, the case illustrated in FIGS. 7A to 7F is different from the case illustrated in FIGS. 1, 2 and 5A to 5E in that the adhesive portion 130 is different in that the adhesive portion 130 is provided on only any one of both sides of the metal piece 120 in the width direction. Accordingly, in the providing of the metal piece 120 on one side of at least one of the edges of the polymer film 101, the metal piece 120 may be positioned on one side of any one of the edges of the polymer film 101 (see FIG. 7C). In this case, as illustrated in FIG. 8A, the metal piece 120 may be provided so that one end of the edge of the polymer film 101 and one end of both ends of the metal piece 120 in the width direction come into contact with each other, and as illustrated in FIG. 8B, the metal piece 120 may be provided so that the metal piece 120 partially overlaps the polymer film 101.

In the state where the metal piece 120 is prepared as described above, the adhesive portion 130 is adhered to at least one of the upper and lower surfaces of the polymer film 101 and the metal piece 120 along the longitudinal direction of the metal piece 120 to cover the boundary portion of the polymer film 101 and the metal piece 120.

In the case of FIG. 8A, the polymer film 101 and the metal piece 120 may be positioned at the same height with respect to the adhesive portion 130, or the polymer film 101 and the metal piece 120 may be provided so that they overlap or do not overlap each other. On the other hand, in the case of FIG. 8B, since the adhesive portion 130 is provided to cover the boundary portion of the metal piece 120 and the polymer film 101 in a state where the polymer film 101 and the metal piece 120 partially overlap each other, the adhesive portion 130 may have a step portion or a step shape.

Figure 7A:
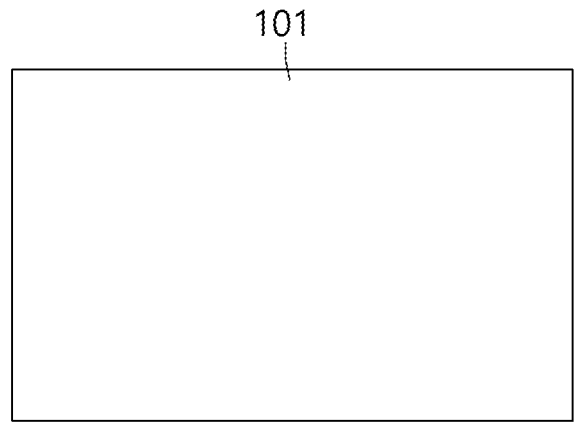
FIGS. 7A to 7F are diagrams for describing a process of manufacturing a current collector for electrodes according to still another embodiment of the present disclosure.
Figure 7B:
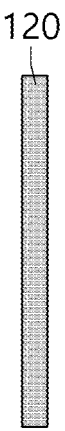
Figure 7C:
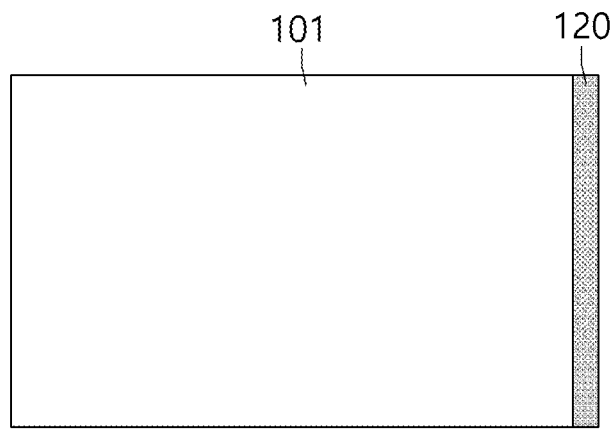
Figure 7D:
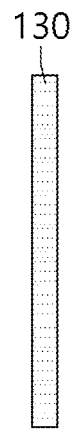
Figure 7E:
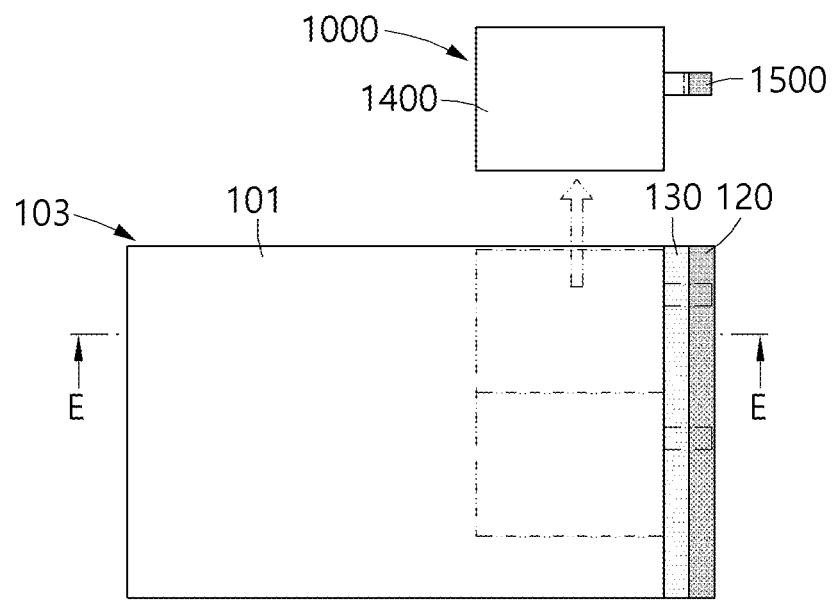
Figure 7F:
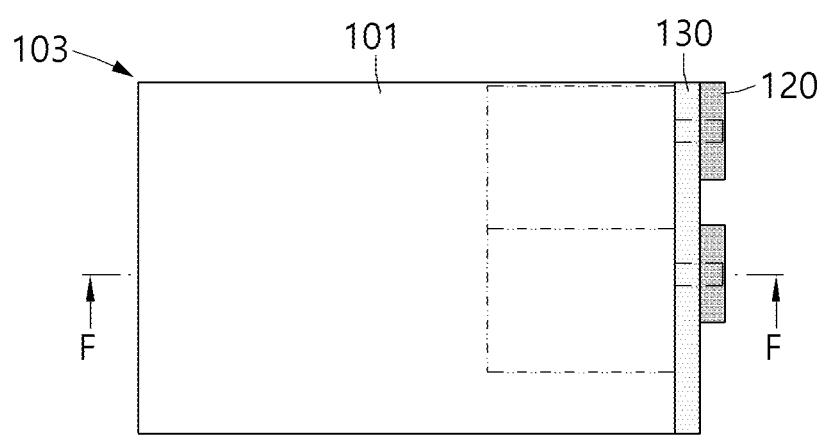

In the providing of the metal piece 120 on one side of at least one of the edges of the polymer film 101, a single metal piece 120 may be provided as illustrated in FIG. 7E, but as illustrated in FIG. 7F, the plurality of metal pieces 120 divided along the longitudinal direction of the adhesive portion 130 or the edge of the polymer film 101 may be provided. In the case of using a plurality of divided metal pieces 120, it is possible to reduce the metal pieces 120 discarded after punching or cutting the current collector 1000 for electrodes.

As in the state as illustrated in FIGS. 7E and 7F, the obtaining of the current collector 1000 for electrodes may be performed by punching or cutting the coalesced polymer film 103 along the shape (see a rectangle marked by a dotted line) of the current collector 1000 for electrodes while the coalesced polymer film 103 is transferred in any one direction. In this case, the obtained current collector 1000 for electrodes may be used to manufacture the stack type electrode assembly 10-1. Unlike the case illustrated in FIGS. 1, 2 and 5A to 5E, in the case illustrated in FIGS. 7A to 7F, not the current collector 100 for electrodes used in the winding type electrode assembly 10, only the current collector 1000 for electrodes used in the stack type electrode assembly 10-1 may be obtained.

Even in the case of FIGS. 7A to 7F, the edge of the metal piece 120 to which the lead tab 190 is connected may be provided at a position that protrudes outward from the edge of the polymer film 101. That is, the lead tab 190 is connected to the tab part 1500 of the current collector 1000 for electrodes, and the edge of the metal piece 120 to which the lead tab 190 is connected is positioned at a position that protrudes outward from the edge of the polymer film 101. Accordingly, the current collector 1000 for electrodes provided at a position where the edge of the metal piece 120 to which the lead tab 190 is connected is provided at a position that protrudes outward from the edge of the polymer film 101 may be stacked to form the stack type electrode assembly 10-1.

In the current collector 1000 for electrodes used in the stack type electrode assembly 10-1 illustrated in FIGS. 7A to 7F, cutting the tab part 1500 and the electrode part 1400 at the same time and looking at the cross sections thereof, the metal piece 120 forming the tab part 1500 may be provided on one side of the edge of the polymer film 101 so as not to overlap each other in the boundary portion with the polymer film 101 or to be located on the same plane, or the adhesive portion 130 may be provided to cover the boundary portion of the polymer film 101 and the metal piece 120 without forming the step portion. Accordingly, the thickness of the tab part 1500 may be reduced.

However, when the thicknesses of the polymer film 101 and the metal piece 120 are the same, even if the metal piece 120 is positioned on one side of the edge of the polymer film 101, the step portion may be provided to cover the boundary portion between the polymer film 101 and the metal piece 120 while not being formed in the adhesive portion 130, but when the thicknesses of the polymer film 101 and the metal piece 120 are different, the step portion may be provided to cover the boundary portion between the polymer film 101 and the metal piece 120 while being formed in the adhesive portion 130.

As described above, in the current collector for electrodes and the manufacturing method thereof according to the present disclosure, since the adhesive portion 130 is manufactured separately and attached with heat, the polymer film 101 and the metal piece 120 are attached to the surface at the same time, it is possible to reduce the thickness of the portion where the lead tab 190 is connected or welded, and when the conductive material 102 is coated or applied, it is possible to increase the conductivity and simplify the manufacturing process for each material of the current collector for electrodes.

Hereinabove, although the embodiments of the present disclosure have been described by specific matters such as detailed components, specific matters, limited embodiments, and the accompanying drawings, they have been provided only for assisting in the entire understanding of the present disclosure. Therefore, the present disclosure is not limited to the exemplary embodiments. Various modifications and changes may be made by those skilled in the art to which the present disclosure pertains from this description. Therefore, the spirit of the present disclosure should not be limited to these exemplary embodiments, but the claims and all of modifications equal or equivalent to the claims are intended to fall within the scope and spirit of the present disclosure.

The invention claimed is:
1. A current collector for electrodes, comprising:
a polymer film;
a metal piece provided on at least one of upper and lower surfaces of the polymer film or one side of an edge of the polymer film;
an adhesive portion provided on the at least one of upper and lower surfaces of the polymer film and on a surface of the metal piece to cover a boundary portion of the polymer film and the metal piece; and
a conductive material formed on a portion of the at least one of upper and lower surfaces of the polymer film, a portion of the surface of the metal piece, and a surface of the adhesive portion,
wherein the adhesive portion is not provided between the metal piece and the polymer film, but covers the boundary portion of the polymer film and the metal piece in order to fix the metal piece directly placed on the at least one of upper and lower surfaces of the polymer film to the polymer film, or in order to fix the metal piece directly placed on the one side of the edge of the polymer film to the polymer film.

2. The current collector for electrodes of claim 1, further comprising:
a lead tab connected to the metal piece,
wherein an edge of the metal piece is provided at a position that does not protrude outward from the edge of the polymer film.

3. The current collector for electrodes of claim 2, wherein the adhesive portion covers the boundary portion of the polymer film and the metal piece positioned inside from the edge of the polymer film, and
wherein the adhesive portion covers at least one edge of edges of the metal piece excluding the edge of the metal piece which is in a direction in which the lead tab extends from the metal piece.

4. The current collector for electrodes of claim 2, wherein the current collector for electrodes provided at a position where the edge of the metal piece does not protrude outward from the edge of the polymer film is wound to form an electrode assembly.

5. The current collector for electrodes of claim 1, further comprising:
a lead tab connected to the metal piece,
wherein the metal piece is provided at a position where at least one edge of edges of the metal piece protrudes outward from the edge of the polymer film.

6. A current collector for electrodes comprising:
a polymer film;
a metal piece provided on at least one of upper and lower surfaces of the polymer film or one side of an edge of the polymer film;
an adhesive portion provided on the at least one of upper and lower surfaces of the polymer film and on a surface of the metal piece to cover a boundary portion of the polymer film and the metal piece; and
a conductive material formed on a portion of the at least one of upper and lower surfaces of the polymer film, a portion of the surface of the metal piece, and a surface of the adhesive portion,
a lead tab connected to the metal piece,
wherein the metal piece is provided at a position where at least one edge of edges of the metal piece protrudes outward from the edge of the polymer film,
wherein the metal piece is positioned not to overlap at the boundary portion with the polymer film or provided on the one side of the edge of the polymer film, so as to be positioned on the same plane as the polymer film, and
wherein, when thicknesses of the polymer film and the metal piece are different, the adhesive portion covers the boundary portion of the polymer film and the metal piece in a state where a step portion is formed.

7. The current collector for electrodes of claim 6, wherein the metal piece is provided to be positioned in a hole formed in the polymer film.

8. The current collector for electrodes of claim 6, wherein the current collector for electrodes including the metal piece provided at a position where at least one edge of the edges of the metal piece protrudes outward from the edge of the polymer film is stacked to form an electrode assembly.

9. The current collector for electrodes of claim 3, wherein the current collector for electrodes including the metal piece provided at a position where the edge of the metal piece does not protrude outward from the edge of the polymer film is wound to form an electrode assembly.

10. The current collector for electrodes of claim 6, wherein the current collector for electrodes including the metal piece provided at a position where at least one edge of the edges of the metal piece protrudes outward from the edge of the polymer film is stacked to form an electrode assembly.

11. The current collector for electrodes of claim 7, wherein the current collector for electrodes including the metal piece provided at a position where at least one edge of the edges of the metal piece protrudes outward from the edge of the polymer film is stacked to form an electrode assembly.

\* \* \* \* \*